March 12, 1968  G. C. WORRELL  3,372,450
MACHINE TOOL
Filed Feb. 24, 1966  7 Sheets-Sheet 1
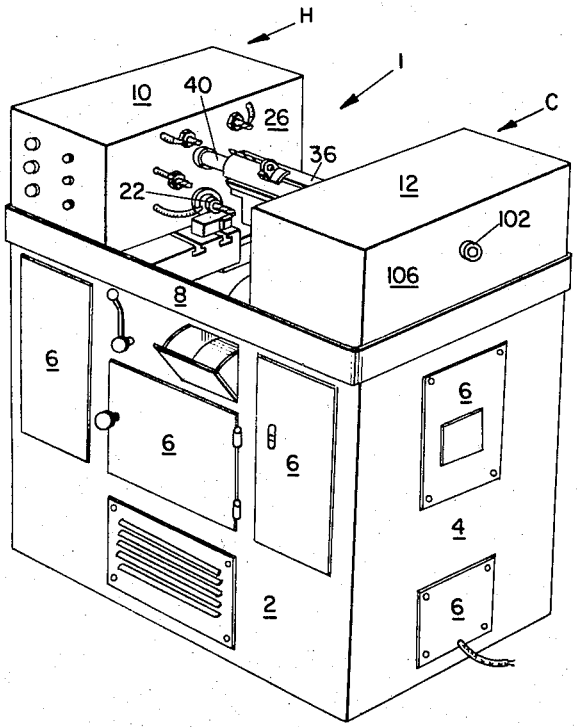
FIG. I.
INVENTOR.
GUY C. WORRELL
BY  *Kenwood Ross*
ATTORNEY.

INVENTOR.
GUY C. WORRELL
BY Kenwood Ross
ATTORNEY.

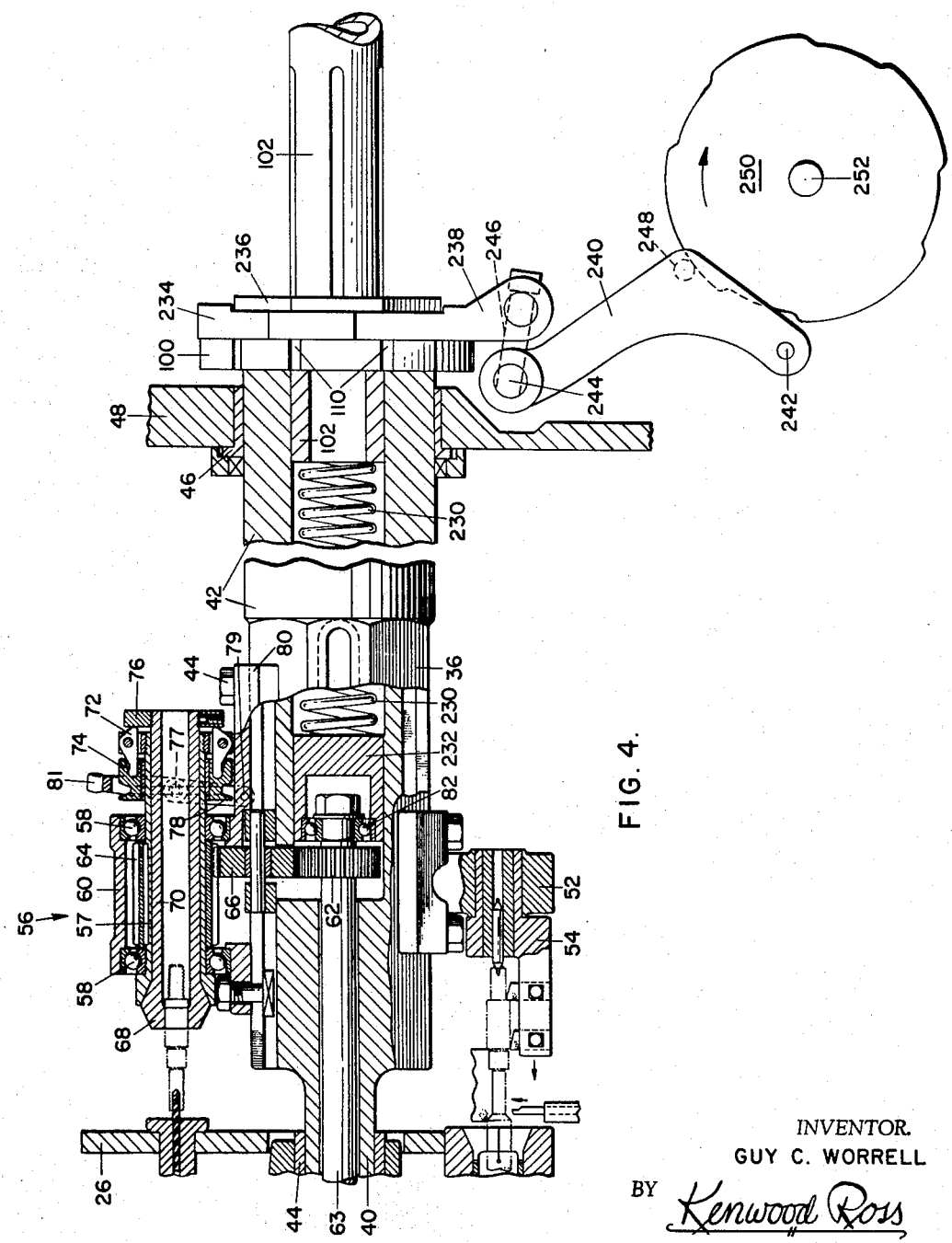

March 12, 1968 G. C. WORRELL 3,372,450
MACHINE TOOL
Filed Feb. 24, 1966 7 Sheets-Sheet 4

INVENTOR.
GUY C. WORRELL
BY Kenwood Ross
ATTORNEY.

March 12, 1968

G. C. WORRELL 3,372,450

MACHINE TOOL

Filed Feb. 24, 1966

INVENTOR.
GUY C. WORRELL

BY *Kenwood Ross*

ATTORNEY.

March 12, 1968 G. C. WORRELL 3,372,450

MACHINE TOOL

Filed Feb. 24, 1966 7 Sheets-Sheet 3

INVENTOR.
GUY C. WORRELL
BY *Kenwood Ross*
ATTORNEY.

March 12, 1968 G. C. WORRELL 3,372,450
MACHINE TOOL
Filed Feb. 24, 1966 7 Sheets-Sheet 7

INVENTOR.
GUY C. WORRELL
BY Kenwood Ross
ATTORNEY.

United States Patent Office 3,372,450
Patented Mar. 12, 1968

3,372,450
MACHINE TOOL
Guy C. Worrell, 10 Woodland Road,
Westfield, Mass. 01085
Filed Feb. 24, 1966, Ser. No. 529,841
5 Claims. (Cl. 29—43)

ABSTRACT OF THE DISCLOSURE

In an automatic screw machine turret indexing and locking and sliding means aimed (1) to control turret operation by means actuated synchronously with or from a slide mechanism and by which control the turret indexing movement may be initiated; (2) to lock the turret in its indexed position including fixed coacting members on the slide mechanism and on the turret, the turret and slide mechanism being separated so that the locking members will not coact during indexing; and (3) to provide, cooperant wtih a reversible slide mechanism, a turret indexing means which is rendered inoperable when the slide operating means is reversed while the machine is under hand control.

The invention relates to that class of machines commonly called "screw machines" or "turret lathes" in which the screws or other articles being formed are acted upon by a series of tools or devices carried in a revolving holder or turret which is turned upon its axis to bring the devices carried thereby successively into line with the work. These machines are usually provided also with one or more cross slides for carrying cutting off, or forming tools, and in some types of these machines the screws or other articles are formed from a rod of stock held in the jaws of a rotary chuck and intermittently fed forward as the articles are successively completed and severed from the end of the rod.

The invention teaches improvements in automatic lathes of the type in which the axis of rotation of the turret is arranged parallel to but not coaxial with the axis of a bar or stock which is fed incrementally forwardly so that machining operations may be carried out on the end of the bar, the work piece thus formed being then parted from the bar.

The invention envisions a type of high speed single spindle continuous feed automatic screw machine allowing economic advantages by the facts that herewith costly secondary operations are practically eliminated and increased production is realized by virtue of the formation of parts at a faster rate than has been possible heretofore with conventional box-tooling methods.

The desiderata of machine designers and manufacturers is to increase production rates without sacrifice of accuracy of machining operations. The progress in this area has been continuous and the impetus has been ever forward and it is with this historic background in mind that the improvements of the present invention have been conceived in a bona fide effort to provide an economically feasible machine where simplicity and durability are primary considerations and which will outproduce competing screw machines without sacrifice of accuracy.

In practically all machines of the broad type comprehended, there are three functions, among many, to be accomplished: first, the rotating of the tool-carrying component to an indexed position; second, the locking of the tool-carrying component upon attaining the desired indexing; and third, the feeding of the tool-carrying component with respect to the work.

It is the primary object of the present invention to teach improvements in such machines as concern turret indexing, turret locking, and turret sliding mechanisms, and, accordingly, the detailed description hereof will refer particularly to that machine area where the tool carrier, called the turret, is moved with reference to the work or work holder, called the spindle, for the purpose of doing work, the movement being called the feed.

Broadly, the objects of the invention are (1) to control turret operation by means actuated synchronously with or from a slide mechanism and by which control the turret indexing movement may be initiated; (2) to lock the turret in its indexed position including fixed coacting members on the slide mechanism and on the turret, the turret and slide mechanism being separated so that the locking members will not coact during indexing; and (3) to provide, cooperant with a reversible slide mechanism, a turret indexing means which is rendered inoperable when the slide operating means is reversed while the machine is under hand control.

In addition to the above objects, the invention resides in detail of construction, organization and arrangement of parts and novel functions as will be apparent as the specification proceeds.

While the invention is susceptible of various modifications and may be practiced in various ways, I have illustrated in the drawings and will describe here in detail the preferred exemplification. It is to be understood, however, that I do not intend to limit the invention by such specific disclosure but aim to cover all modifications and alternative constructions and methods falling within the spirit and scope of the invention as expressed in the appended claims.

In the drawings:

FIG. 1 is a perspective view of a single spindle automatic screw machine of the type to which the mechanisms of the invention may be adapted;

FIG. 4 is a fragmentary view of a turret, partly in section, and driving means therefor, showing a bearing means at each opposite end of the turret and a live spindle mounted upon the turret, with the live spindle being shown as driven through the turret by means of a spline and related gear train to a main turret spindle;

Figure 3:
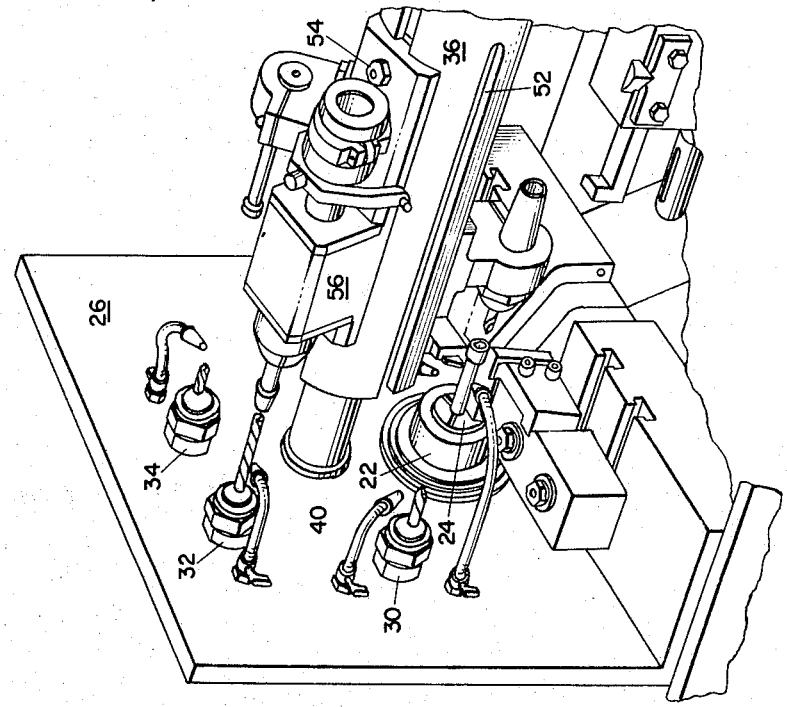
FIG. 3 is a fragmentary view, on an enlarged scale, similar to FIG. 2 and showing the cut off work piece which has been indexed and in process of being drilled by a live turret spindle while another work piece is being simultaneously formed and drilled at the main spindle.

The machine envisions an automatic turret lathe of the single spindle type in which a turret carrying different tools is rotatable about its own axis to bring each tool in seriatim into line with the axis of the main machine spindle wherein the axis of rotation of the turret is parallel to, but not coaxial with, a main driving shaft and the main spindle. The said main driving shaft and main spindle are disposed horizontally and the turret is spaced more or less vertically thereabove, although the axis of the turret may be arranged below or in any other position relative thereto.

Whereas the invention comprehended is shown, for purposes of illustration, as applied to an automatic screw machine, it may be applied to any similar machine tool where the functions and operations of the invention are found suitable.

As viewed in FIG. 1, the various elements of the exemplified machine are arranged in a trio of main groups, a first driving gear or headstock group which is located on the left of the machine in the area generally indicated by the letter H, a second turret and intermediate parts group located centrally of the machine in the area generally indicated by the letter I, and a third or control group located on the right in the area generally indicated by the letter C. It will be with the third or control group C, incorporating the means for controlling rotation and reciprocation of the turret, that this invention is primarily concerned.

The main or lower housing is of generally rectangular shape and may be enclosed by a front wall 2, a spaced opposite rear wall 3 and spaced opposite end walls 4, with access openings having covers 6 hinged or otherwise mounted relative thereto in strategically located positions in the front, rear and end walls.

The main or lower housing is provided with a closure member 8 and portions of the left or drive gearing may be enclosed, if desired, by an upper housing 10 and the portions of right or control mechanisms may be enclosed, if desired, by an upper housing 12.

The first driving gear or headstock group H need be only briefly described as being inclusive of an electric motor M serving to drive a horizontally-disposed main driving shaft 20 at a constant speed and to drive various other components connected through suitable gear trains. Main driving shaft 20 extends generally lengthwise of the machine and is suitably mounted in bearings in conventional manner. Disposed in parellelism with main driving shaft 20 and suitably connected thereto as by a gear train for being driven thereby is a main spindle 22 rotatably mounted by bearings within a conventional quill and having an inboard free end or head extending through and journalled in a transverse wall or headstock 26 of upper housing 10. See FIGS. 2 and 3.

As is conventional, the head of main spindle 22 is provided with an inboard tapered seat. The spindle carries therewithin a draw bar and feed tube and at its inboard end a collet 24 having a forwardmost conical or tapering outer configuration which accommodates to the correspondingly tapered seat of the spindle.

The spindle/collet/feed tube arrangement is well understood and will be only briefly recited herein. The conical head of the collet is split at diametrically opposite positions to provide resilient jaws and at its rearward end is threaded to or integral with the forward end of the draw bar, which collet and draw bar are rotatably supported within the main spindle having the conically recessed forwardmost head complemental to the conical head of the collet. As rotation is imparted to the main spindle, such rotative movement is translated to the collet and draw tube wherefor the draw tube, collet and feed tube are all rotated at a high rotational speed. With the collet disposed forwardly of the head of the main spindle and its jaws distended, the collet is ready for the work-advancing-therethrough movement by means of the feed tube adapted frictionally to advance the work through the collet jaws. When and as it is desired to effectuate a collet closing movement, means are actuated to draw the collet rearwardly and hence the collet jaws into the conical recess of the spindle head, thus clamping the collet jaws upon the work. Following clamping, means are rendered operative to draw the feed tube rearwardly along and relative to the work for obtaining a new purchase thereon. The work is gripped automatically by the collet at the beginning of an operating cycle and is released at the end thereof, or, as may be desired, at some intermediate point in the cycle. When released, it is moved forwardly by known means until the end of the work engages a stop means. Following the desired work performing steps, the draw tube is actuated forwardly so as in turn to drive the collet forwardly, thus releasing the collet jaws for advancing movement of a successive length of work thereto for subsequent clamping and work performance.

In the intermediate area I, a turret 36 is horizontally-disposed and has an axis of rotation parallel to, but not coaxial with, the axes of main driving shaft 20 and main spindle 22 and the work which is fed incrementally forwardly theretoward so that the machining operations may be carried out on the end of the bar, the component formed being there parted from the bar.

Main spindle 22 carrying the rotatable bar or stock is mounted in fixed headstock 26 which additionally comprises a plurality of fixed headstock stations such as 30, 32, and 34 arranged concentrically with the axis of turret 36, the spindle carrying the bar or stock itself constituting another of such headstock stations.

A corresponding plurality of turret stations, also concentric with the axis of turret 36, are equiangularly disposed and at equal distances from the turret axis whereby each turret station coincides with a headstock station for all rotational settings of the turret, each of the headstock and turret stations being provided with relatively rotatable or non-rotatable elements adapted to hold the work, a tool, or a cut off length of the bar of stock.

As is usual, turret 36 is mounted so that it can be rotated to any one of a number of positions in which the turret stations are brought in succession into line with the axis of the work whereby a tool carried by the turret station performs an operation on the rotating work.

Turret 36 may be reciprocated lengthwise during the course of each operation, and after each operation is completed, the turret may be withdrawn, rotated to a new position with a different turret station coinciding with the axis of the work and locked in position while a further operation is performed.

With reference to FIG. 4, turret 36 will be observed to be supported by extensions forming bearing journals 40, 42 integral therewith so that it may be held rigidly in situ and moved lengthwise in opposite directions and to be rotatable and slidable in suitable bearings in the housing walls.

The control means, to be described, functions to control the movement of the turret.

Bearing journal 40, adjacent headstock group H, is mounted in an elongated bush 44 supported by and extending through headstock 26.

Bearing journal 42, adjacent control group C, is of large diameter and is mounted in a suitable bush 46 carried by a transverse wall 48 of upper housing 12.

Turret 36, shown for purposes of illustration as being formed with four turret stations, may be provided with any suitable number of such, and may be of circular form as in FIGS. 1–3 and 8 or of octagonal form as in FIG. 4 so as to be adapted to carry four detachable turret attachments which are spaced equi-angularly, there being one at each of the stations circumscribing the turret and each so positioned on the turret that the tools or work supported thereby may be brought in seriatim into coaxial alignment with main spindle 22, with the turret being locked in that position while an appropriate work operation is performed.

Turret 36 may be locked in any one of its four positions, and when so locked each of the turret stations is in coaxial alingment with one of the plurality of headstock stations mounted on headstock 26, there being an equal number of headstock and turret stations, as aforesaid.

Following work performance, the turret may be rotated to a new indexed position and again locked in situ, with each of the turret stations again being in coaxial alignment with a new headstock station.

The headstock stations are normally provided with tool holders for supporting operating tools, such as drills, rose bits, reamers and the like, the tool holders and supported tools projecting forwardly from the headstock face into intermediate area I.

The turret attachments may each be of the dead or live type, as desired, and may be arranged in any desired circumferential order around the turret to suit operational needs.

Figure 2:
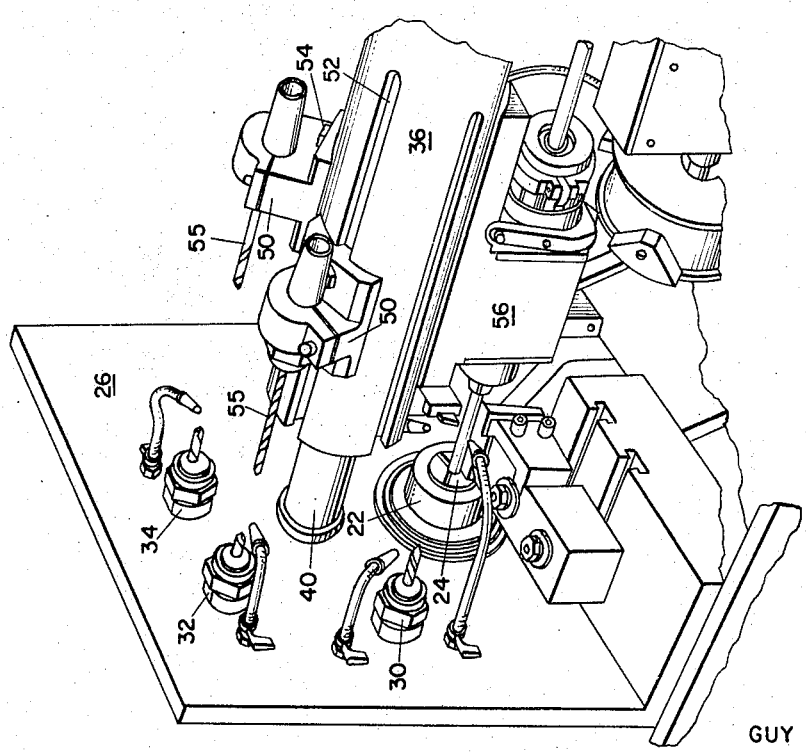
FIG. 2 is a fragmentary view, on an enlarged scale, of the spindle and associated parts showing a work piece in process of being formed and cut off as it is driven at both ends by the main and live spindles of the machine.

In FIG. 2, a pair of dead or non-rotating turret attachments 50 are shown as comprising tool holders for non-rotating tools, such as turning tools, reamers and the like, with splines in the bases of such attachments being receivable in suitable undercuts or longitudinal slots 52 in the turret and being clamped thereto as by bolts 54, all so as to allow the holding of tools, such as 55, in axes parallel to the rotational axes of the turret and main spindle.

Also in FIG. 2 is shown a turret attachment such as 56 which comprises a live or rotatable spindle, also disposed parallel to the rotational axes of the turret and main spindle. Such live spindle will be coaxial with the main spindle when the turret is rotated to appropriate position and is driven through a turret spindle 63 and an associated train of gearing, which turret spindle in turn is driven by other gearing connecting to the main spindle and main driving shaft wherefor its operating speed is synchronized.

In FIG. 4, showing in detail one such live or rotatable turret attachment 56, a gear wheel 64 is seen to be driven through an idler 66 from a gear wheel 62 so as to provide an arrangement allowing lengthwise adjustment of the live attachment along the supporting turret so as to suit the requirements of any particular operation.

Such live or rotatable spindle is adapted to support a rotatable element 57 by means of bearings 58 held within an outer ring 60, which rotatable element is driven by gearing from gear wheel 62 on turret spindle 63, which turret spindle is coaxial with the turret axis and parallel to the main spindle axis. By suitable gearing, turret spindle 63 may be driven at the same speed as main driving shaft 20 or at a different speed, as may be required.

Rotatable element 57 may carry such as a collet 68, which collet may be expanded to release a finished component and contracted to grip a second partly-finished component before the said second component has been parted from the work bar. A conical end of the collet is divided by radial slots to engage a conical opening in the left end of the rotatable element in known manner and is integral with a collet tube 70 concentrically mounted within the rotatable element. The collet closing and opening operations may be effected by such as levers 72 pivoted on rotatable element 57 and adjustably controlled by a grooved operating collar 74, slidable endwise in known manner, the levers being adapted to engage a collar 76 secured on the end of collet tube 70 which is thus moved lengthwise toward the right (as viewed in FIG. 4) into the gripping position and toward the left into the opening position.

Operating collar 74 may be adjustably positioned by pins 77 disposed on opposite sides thereof and carried by a forked lever 78 pivoted at 79 to a base 80 of the attachment and having a ball or pin 81 movable so as to open collet 68 by its engagement with a suitable stop means as the turret is rotating and immediately before it reaches a new position in which the collet is coaxial with the work. After effecting collet disengagement, ball 81 moves clear of its stop to a position in which the collet is coaxial with the work. As soon as the turret has been moved sufficiently forwardly with collet 68 over a partially-machined component, the collet is closed so to grip the component and may remain closed for the next successive operations until a corresponding stage in the cycle of operations on the next component is reached.

Turret spindle 63 is sopported at one end by a bearing 82 (see FIG. 4) and at its other end through a splined connection with a hollow shaft connected to its gear train (not shown), thereby allowing adequate longitudinal movement of the turret spindle relative to bush 44 so that it may follow the reciprocating movement of turret 36.

The bar or stock to be worked is fed to the machine from the left, as viewed in FIG. 1, is extended through main spindle 22, and is centered and driven by collet 24 carried in the inner end of the main spindle, being gripped automatically by the collet in the appropriate position at a commencement of a cycle of operations and released thereby at a termination of said cycle, or, as may be required, at some intermediate point in the cycle. When released, the bar is normally moved, in an inboard direction, by known means until the inner end engages a conventional stop preparatory to a next cyclic operation.

The work component, after it has been parted from the bar stock, may be carried by the rotational movement of the turret to one or more of the headstock stations in seriatim as required, all whereby both ends of the component may be machined during a complete cycle of operations.

One typical sequence of operations may be briefly considered, wherein the turret, carrying four such attachments delineating four turret stations, is rotatably adjustable with respect to four headstock stations.

For the first operation, a collet at the forward end of the main spindle is released and the bar stock is fed forwardly until the end abuts against a suitable stop means, the stock being then clamped in position by the collet. Such abutment may be constituted by the end of a bar or the like carried by the attachments on a turret station, the turret being adjusted lengthwise to a suitable position. Alternatively, the end of the bar may abut against a stop carried independently of the turret by a swivelling lever or other mechanism operated directly or indirectly from the main driving shaft.

The second operation, the turret is rotated and locked in position with a turret station coinciding with a headstock station constituted by the main spindle. One or more cutting operations may then be carired out. For example, two turning tools may cut surfaces of two different diameters each of a pre-arranged length, the turret being fed forwardly at a suitable speed. Toward the end of this cutting operation, a center drill may engage the end of the work piece or component, the center drill and the two turning tools both being carried by the turret attachment at a turret station.

During this operation, a form tool may be brought against the bar stock. For example, it could be brought against the rear end of the first work piece or component close to the collet on the main spindle, or it could be brought against the work piece at any other part of its length. It might, for example, be desired to modify the shape of some part towards the end of the rod which had already been machined. The form tool is carried independently of the turret and is adjusted in synchronism with the operation of the machine from the main driving shaft. It may, for example, be so guided that it is fed transversely.

In the third operation, the turret is again rotated and locked in a new position with another live turret station having a live or rotating spindle in alignment with the main spindle. The end of the rod could then, for instance, be screwed by a die head which would be rotated by the live spindle at a different speed from the main spindle speed so that the screwing operation could be performed without any slowing of the main spindle.

In order to effect the withdrawal of the die head rearwardly, the speed of rotation of the die head relative to that of the main spindle could be altered so that the die head would rotate at a speed higher than the speed of the main spindle. The turret could then be slowly returned until the die head disengaged the ends of the rod.

The same principle of faster or slower relative speeds could be utilized in tapping, reaming or other operations which, of necessity, have to be carried out more slowly than turning or drilling operations.

The die head might be replaced by another tool such as a drill or turning tool. The attachment with a live spindle would then be replaced by another attachment without driving means.

The fourth operation, the turret is rotated and locked in position with another live turret station coinciding with the main spindle. In this position, a collet carried in or otherwise associated with the forward end of the live or rotating spindle carried by the turret is then operated. The turret is fed forwardly until the collet encircles the end of the component and is then contracted. The component is held firmly in and rotated by the collet, which rotates with the live spindle, at the forward end of the main spindle. While so held, a parting tool could come into operation to part the component from the bar stock. By so supporting the component on both sides of the parting tool, during the parting operation, it is possible to machine the rear end of the component and the front end of the next succeeding component. The collet on the main spindle is now operated so as to release the component which is, however, still held by the collet on the live spindle on the turret.

For the fifth operation, the turret is rotated and locked in position with one live turret station coinciding with a headstock station and with another turret station coinciding with the main spindle. While the live spindle and first component are still rotating, the rear end of the component could be fed forwardly against a non-rotating tool mounted at the headstock station to carry out another operation, for example center drilling.

While this operation is being carried out on the first component, the bar stock is fed forwardly until the end abuts against a stop on the other turret station, and the cycle of operations for a second component would commence.

For the sixth operation, the turret would be rotated into a position such that the rear end of the first component, while still held in the collet at a turret station, may have a further operation effected from a tool held in the headstock station. For instance, the end of the first component might engage a fixed drill, the turret being fed forwardly to give the necessary feed so that a suitably depthed hole could be drilled.

At the same time that the operation on the first component is being carried out, the second component would be turned and center drilled by the tools in another turret station, in the same manner as the first component, the later operations on the first component overlapping in time with the earlier operations on the second component.

For the seventh operation, the turret could be turned to a position in which a live turret station coincides with a head stock station carrying a drill of smaller diameter, and a further hole could be drilled in the rear end of the first component. At the same time, the second component carried in the main spindle could be screwed by the die head carried in a live turret station for an operation which might be the same as the third operation.

During the course of the several operations, the first component, having gone through several intermediate positions, would be returned by the rotatable adjustment of the turret to its first position in which it is co-axial with the main spindle to constitute the eighth operation corresponding with the fourth operation and completing the first component cycle of operation.

Before this stage has been reached, the earlier operations on the second component would have been completed, so that it is then ready to be engaged by the collet on the live spindle in the turret. The turret is now moved forward, so that the end of the second component would eject the first component rearwardly through the hollow center of the collet. The collet would then receive the forward end of the second component, while further forward movements of the turret would close the collet onto this component.

The remaining steps in the cycle of operations would then be carried through on the second component in the manner described in connection with the first.

As soon as the second component is released by the collet on the main spindle, the bar stock is moved forwardly until it engages the stop and is then gripped by the main collet. The cycle of operations is then commenced in similar manner on a third component.

Locking of the turret in any of its four operative positions, so that rotational play thereof is not experienced, is an obvious desideratum and the indexing/locking means and system by which the bearing-mounted turret travels and is locked during its reciprocatory forward and aft movements is next to be described.

Let it be made clear that, herewith, I provide an improved turret indexing mechanism which is not only capable of indexing effectively and satisfactorily turrets of the medium and smaller sizes but is also capable of indexing smoothly, quickly and positively into precision positions turrets of large sizes and turrets carrying heavy tools which extend far out from the turret. The indexing mechanism indexes the turret and holds the turret firmly and steadily in precision indexed positions without setting up strains which would be damaging to the machine or tend to impair its accuracy.

The mechanism now to be described incorporates mechanism which permits indexing of the turret while the turret-slide is in its extreme backward position and not in motion and permits the indexing of any selected number of faces prior to the advance of the turret-slide toward the spindle, whereby the turret may be indexed past turret faces which may carry no tools or are not desired to be used, so that reciprocation of the turret-slide with such idle turret faces toward and from the spindle nose is not required before another turret face, which carries tools desired to be used, is indexed.

According to the teaching hereof, there is a control means incorporated hereinto whereby the turret may be indexed to any one of its indexible positions from any other index position without requiring traverse feed of the turret and there is also a control means which operates automatically to index the turret to the desired index stations in the sequence desired, the control preferably being settable whereby the stations desired and the desired sequence may be preselected.

As is customary with most turret lathes, the turret-slide is reciprocated with "feed" motion (a slow motion during cutting operation) and with a "rapid traverse" motion ( a fast or quicker motion when the turret slide is not in "feed" motion), this rapid traverse motion being obtainable in various ways from the power source.

An annular turret locking disc 100 is concentric with and stationarily secured to the rearwardly-facing end face of bearing journal 42 of turret 36 so as to be vertically or transversely-disposed relative thereto and to be rotative therewith and a horizontally-disposed splined turret shaft 102 of reduced diameter is provided so as to extend rearwardly from its nesting seat within the bearing journal and to be journalled at is outboard end in a hub 104 extending inwardly from end wall 106 of upper housing 12. The turret and locking disc are shiftable relative to the turret shaft as same are reciprocated.

Locking disc 100 is provided upon its peripheral edge with a plurality of radially-arranged ground and hardened recesses or indexing slots 110 functioning to allow the locking of the turret in each of its operative indexed positions in a precision manner and to preclude rotational play or weaving thereof while so positioned. Said indexing slots will correspond to the number of turret stations, there being two such slots for each turret station.

At each opposite side of turret 36, a horizontally-disposed location plate 114 is disposed in the plane of the turret center line and suitably secured, as by cap screws 116, to rails 118 forming part of upper housing 12 whereby the location plates are disposed in a coplanar manner so as to face toward each other and the turret and locking disc therebetween. Each location plate 114 is suitably configured as by a slot or recess therethrough to allow horizontal reciprocation therewithin of a location bar 120 having an outwardly-facing ground and hardened way 122 and being spring loaded as by a pair of compression springs 124, there being one such spring within the slot or recess preferentially at each side of the bar.

Ways 122 of the location bars are receivable in seriatim in pairs of diametrically-opposed indexing slots 110 of turret locking disc 100.

With the turret withdrawn in retrograde manner to the limit of its movement away from the headstock and rotatable spindle, the ways of the location bars are moved clear of the indexing slots in disengaging manner wherefor the turret and locking disc are free to rotate unisonly so that the turret may be rotated through the correct angle to a next desired operative position. The location bars are so withdrawn from the indexing slots by a pair of coacting pull out levers, each in the form of a bell crank 130 pivotally mounted at 132 relative to the upper housing. In each case, the free extremity of one arm of the pull out lever is nestably receivable in aligned openings 133 through the respective location plate and related location bar. In each case also, the free extremity of the other arm of the pull out lever is pivotally connected to pivot pin 134 common to both of the pull out levers in manner such that the levers coact with an adjustable stop 136 engageable with a similar stop 138 provided on the free end of the driving arm of a lever 140 pivoted to the housing as at 142. A follower or roller 144, carried by an opposite end of lever 140, follows an intermittently rotatable cam 146 so as to achieve, according to the rotation of the cam, a rocking of said lever and a throwing of the arms of the pull out levers to the end that the location bars are unisonly withdrawn, each from its locking position within a respective indexing slot of the locking disc. The turret is thus free to be indexed.

Cam 146 is keyed to a stub shaft 148 journalled in a hub 150 extending inwardly from end wall 106 of upper housing 12, said stub shaft additionally mounting a sprocket 152 adjacent the cam.

An endless chain or belt 154 extends between and is entrained around sprocket 152 and a sprocket 156 carried by a clutch shaft 158 journalled within and mounted relative to the lower housing.

Figure 9:
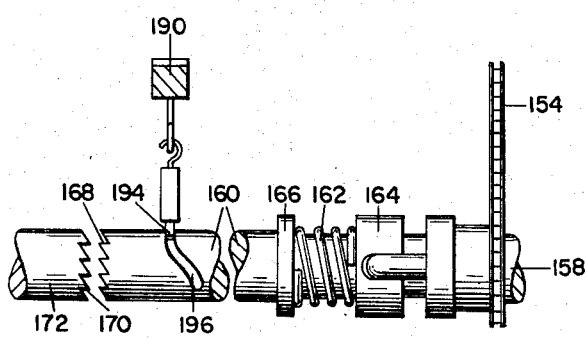
FIG. 9 is an enlarged fragmentary view in front elevation of the indexing clutch of the invention.

With reference to FIG. 9, clutch shaft 158 mounts a coaxially aligned coupling 160 which is spring-loaded as by a compression spring 162 sleeved upon said clutch shaft between an annular clutch shaft shoulder 164 and an annular coupling shoulder 166 to facilitate a lateral movement of the coupling toward and away from the clutch shaft.

A continuous drive clutch is provided in the form of one end face of the coupling having peripherally arranged clutch teeth 168 meshable with complemental peripherally arranged clutch teeth 170 provided on an adjacent end face of a coaxially-aligned trip dog shaft 172.

The trip dog shaft mounts a pulley 174 driven by means of an endless belt 176 entrained therearound and around a pulley 178 extending outwardly from a gear housing 180 seated upon a platform 182 in the lower housing, said pulley being carried by the shaft of one of a trio of intermeshing gears 184 journalled within the gear housing. The trio of gears are interconnected to the drive shaft of motor M through a belt 186, through which train the motor drives trip dog shaft 172.

In the case of the continuous drive clutch, teeth 168 of coupling 160 are normally urged into mating engagement with teeth 170 of trip dog shaft 172 by means of compression spring 162. So engaged, rotation is imparted to the trip dog shaft thereby to set up a concomitant rotation of clutch shaft 158 and a driving of drive chain 154 to effect rotation of cam 146.

Means for disengaging the clutch, thereby to preclude rotation of cam 146, comprises an elongated trip dog arm 190, having one end extending above and transverse to the axis of the trip dog shaft/coupling/clutch shaft assembly and pivotally mounted on the housing at 192 and carrying near its said one end a depending cam follower 194 which is engageable in a provided cam groove 196 on the coupling periphery.

At its opposite end, trip dog arm 190 mounts an upwardly projecting trip dog 198 which is engageable by one or more of a plurality of trip dogs 200 carried by and radially extending from a trip dog gear 202 fixed to a shaft 203 journalled in the housing.

Figure 6:
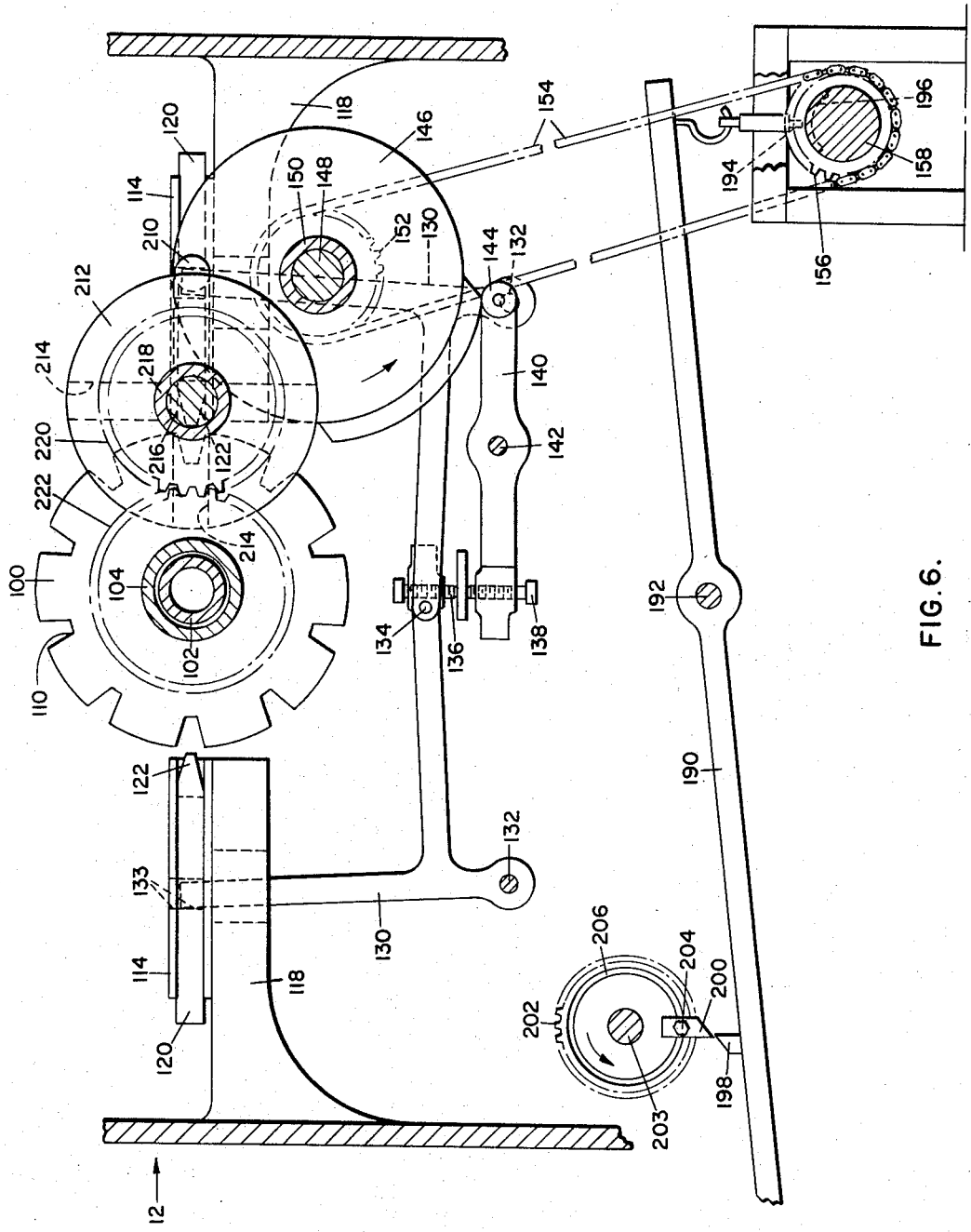
FIG. 6 is a fragmentary sectional view on line 6—6 of FIG. 5 showing the location bars in withdrawn positions and the turret in a ready-for-indexing position.

In FIG. 6, one of such trip dogs 200 is shown as extending outwardly from trip dog gear 202 and being circumferentially adjustable relative thereto by means of bolting 204 extendable through the trip dog and receivable within an annular track or recess 206 provided in a face of the trip dog gear. The preselected setting of the trip dog serves to determine the timing of the throw of the clutch.

Figure 7:
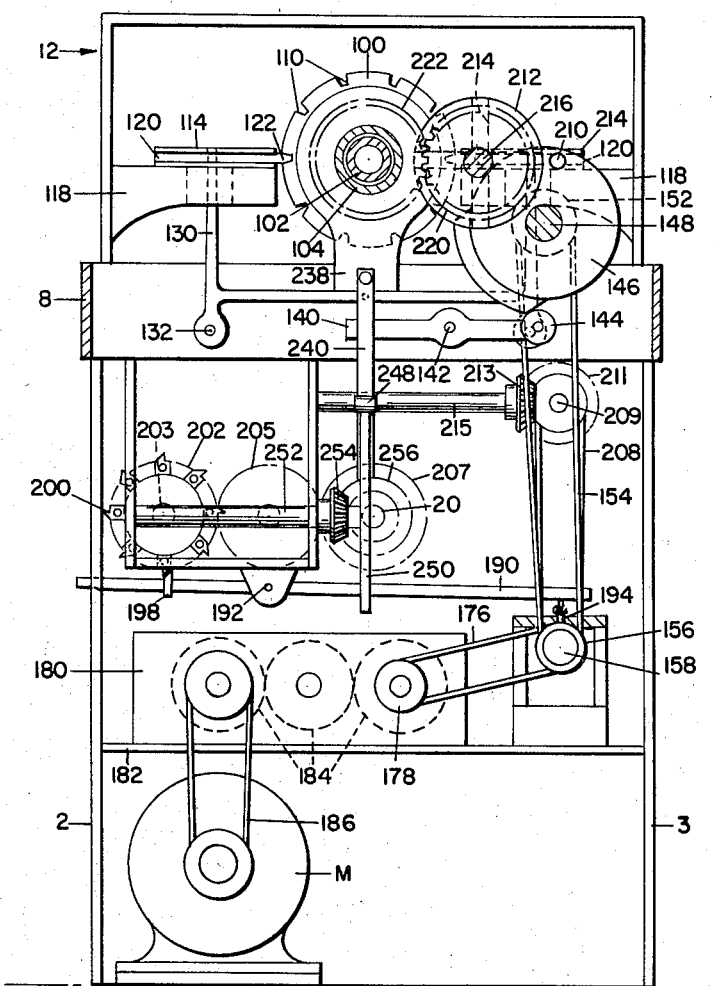
FIG. 7 is a view in end elevation, with certain parts in section and with other parts omitted, showing the location bars in position relative to the locking disc and the turret in a locked and ready-for-travel position.

Rotation of trip dog gear 202 is attained by means of a gear train which includes an idler gear 205 intermeshing with the trip dog gear and a main drive gear 207 mounted on main driving shaft 20. The main drive gear is driven, as may be appreciated by reference to FIGS. 7 and 8, by means of a chain or belt 208 entrained around sprockets, not shown, which are mounted one on trip dog shaft 172 and one on a stub shaft 209 journalled in the lower housing frame. Stub shaft 209 mounts a bevel gear 211 in mesh with a bevel gear 213 fixed to a stub shaft 215 also journalled in the lower housing frame. An idler gear 217 also fixed to stub shaft 215 meshes with a worm drive gear 219 mounted on another stub shaft 221 journalled in the lower housing frame. The worm drive gear meshes with a worm gear 223 fixed to main driving shaft 20. Rotation of trip dog shaft 172 rotates stub shaft 209 through chain 208 in turn to rotate bevel gear 211 and thus to rotate stub shaft 215 with a concomitant rotation of idler gear 217 and stub shaft 221 and worm drive gear 219, all so as to drive worm gear 223 and hence to rotate main driving shaft 20. The rotation of the main driving shaft drives main drive gear 207 so as to drive trip dog gear 202 through idler gear 205.

The rotative paths of trip dogs 200 on the trip dog gear as same is rotated brings them in seriatim into contact with trip dog 198 on the trip dog arm so as to cause the opposite forward end of the trip dog arm to swing downwardly, thereby to move cam follower 194 out of cam groove 196 in the coupling. With the cam follower so disengaged, compression spring 162 urges coupling 160 laterally to the left, as viewed in FIGS. 8 and 9, so as to couple clutch shaft 158 to the rotating trip dog shaft 172.

When a trip dog 198 on the trip dog arm clears a trip dog 200 on the trip dog gear, the rearward end of the trip dog arm swings downwardly to cause its opposite forward end to swing upwardly, thereby to move the cam follower into the coupling cam groove whereby, coupling 160 is urged laterally to the right against the tension of compression spring 162, to disengage the clutch, thereby disengaging the clutch shaft from the rotating trip dog shaft with the result that chain 154 ceases to drive cam 146.

With cam 146 rendered non-rotative, in point of time, as the cam is out of contact with follower 144 on lever 140, location bars 120 remain in indexing slots 110 of the turret locking disc thereby to lock the turret.

Figure 5:
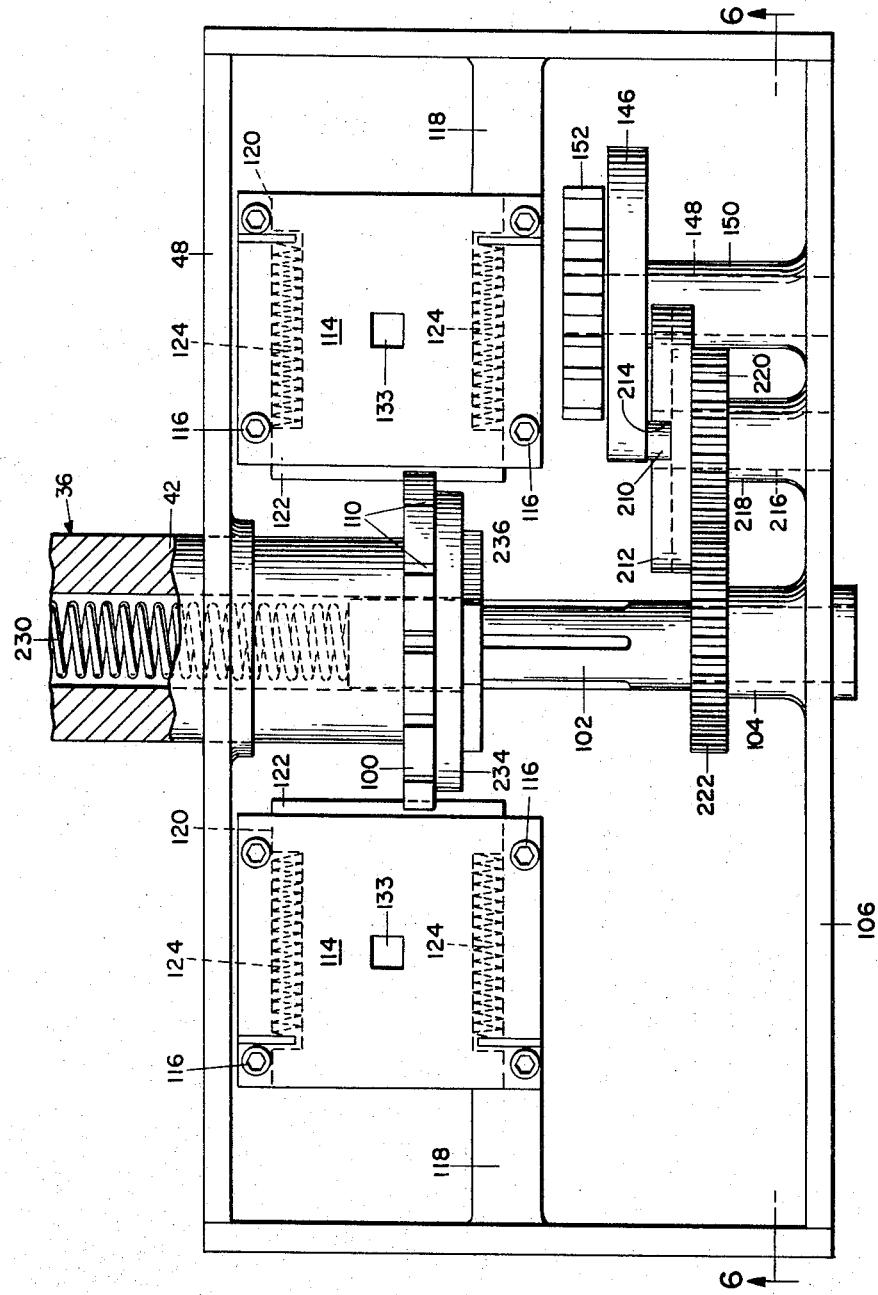
FIG. 5 is a fragmentary view in top plan with parts omitted for clarity, showing the turret in travelling position on the ways of a pair of location bars and also showing the Geneva motion for effectuating turret indexing.

With reference next to FIGS. 5 and 6, a follower 210 extends horizontally outwardly from the planar face of cam 146 facing toward end wall 106. A Geneva 212, mounted with respect to the rotative path of the follower, is provided in its planar face toward the follower with four radial slots 214 located at 90 degrees as to each other. The Geneva is keyed to a shaft 216 journalled in a bearing 218 carried by end wall 106 and is positionable between cam 154 and shaft 102 of the turret. Follower 210 is engageable in one of the Geneva slots 214 each time cam 146 makes a complete revolution, thereby turning the Geneva a one quarter revolution.

A gear 220 which is fixed to shaft 216 between Geneva 212 and bearing 218 is in mesh with a gear 222 fixed to turret shaft 102 in manner such that Geneva rotation establishes a concomitant rotation of turret shaft 102 and the turret locking disc and the turret to a next indexed position.

Follower 210 is so diametrically opposed to follower 144 on lever 140 that as follower 210 enters one of the radial slots 214 in the Geneva, the high point of the cam comes into contact with follower 144. As follower 210 sets up a quarter revolution of the Geneva, the high point of the cam contacts follower 144 so as to pivot the lever and thereby to move location bars 120 toward and into engagement with a pair of indexing slots of the turret locking disc wherefor the turret is thus readied for movement into its forward operating range toward the head stock, riding forwardly upon the spring-loaded ways 122.

The Geneva and the camming action which causes the arms of the pull out lever to throw outwardly, wherefore indexing is attained, is of appropriate dimension wherefor a generous leverage component is offered for indexing the turret against opposition to indexing offered by the weight of the turret and the weight and leverage effect of the tools thereon.

In travelling forwardly in feeding position or rearwardly in non-feeding position, the turret is locked in position, the location bars providing the slide means upon which the turret rides and the locking means for precluding turret weaving or chattering.

Figure 8:
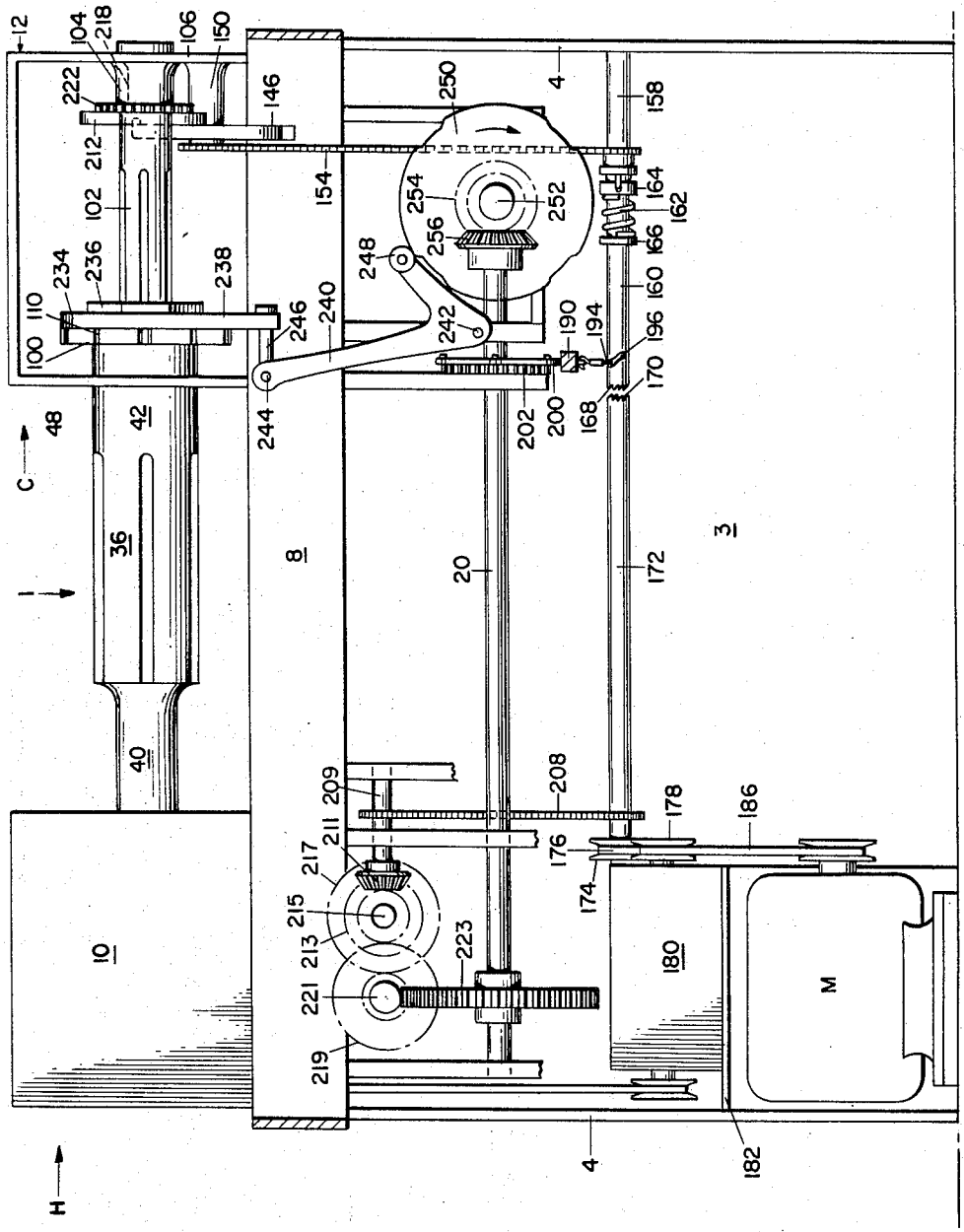
FIG. 8 is a view in front elevation, of the machine of the invention, again with certain parts in section and other parts omitted for clarity.

Means for reciprocating the turret forwardly includes a heavy compression spring 230, see FIGS. 4 and 5, disposed in the bore of the turret and fixed at one end to an end of turret shaft 102 and at an opposite end to an interior turret rib 232. As the turret is retracted, the spring is placed under compression whereby it can drive the turret outwardly on the return stroke. A drive plate 234 suitably fixed to a planar face of turret locking disc 100 is held relative to the turret as by a collar 236 threadedly engaged with turret shaft 102, and defines a depending portion 238 projecting below the plane of the locking disc and turret. A driving arm 240, which may take either of the bell crank forms shown in FIGS. 4 and 8, is pivoted to the lower housing as at 242, and has one arm pivoted as at 244 to one end of a lever 246 fixed at its opposite end to depending portion 238 of the driving plate. The other arm carries a follower 248 which is engageable with a turret cam 250 fixed to a shaft 252 journalled in the lower housing.

Rotation of turret cam 250 is effected by means of a bevel gear 254 fixed to shaft 252 and meshing with a bevel gear 256 provided on the adjacent free end of main driving shaft 20.

The high and low points on the cam may be spaced at any desired intervals around the periphery of the cam to provide the desired intervals of turret rest and turret travel.

From the foregoing, it will be apparent that I provide in the control group c, means for reciprocating the turret, means for locking the turret against rotation during periods of reciprocation, and means for rotating the turret to new indexed positions during periods of non-reciprocation, with all functions being carried out in timed relation.

I claim:
1. In an automatic turret lathe having a rotatable turret with a plurality of turret stations one of which has a live spindle and a headstock having a plurality of fixed headstock stations and a live spindle station arranged in opposition to the turret stations, a turret indexing and locking and sliding mechanism comprising:
   a turret support,
   a turret drive means for reciprocating the turret relative to the support, rotating and indexing means to rotate the turret and locate the same in a plurality of rotational indexed settings with the turret stations coinciding with the headstock stations at all settings,
   a controlled source of power for driving the rotating and indexing means at selected and predetermined times,
   turret lock means engageable with the turret,
   a driving connection between the source of power and turret and including a clutch and a clutch shifting device connected to the clutch and operable to engage and disengage the clutch,
   a first rotary camming mechanism driven from the driving connection to operate the clutch shifting device for engaging and disengaging the clutch and alternately disengaging and engaging the turret lock means with the turret, and a second rotary camming mechanism driven from the driving connection and operably connected to the turret drive means to reciprocate the turret when the turret lock means is in engaged position, the turret lock means including a peripherally-notched locking plate fixed to the turret and a pair of diametrically opposed locking bars slidably mounted upon the turret support and selectively engageable in the notches of the locking plate.

2. In the automatic turret lathe according to claim 1, wherein the secondary rotary camming connection includes a cam rotatably mounted on the turret support, means connecting the cam to the locking bars to move the locking bars into and out of engagement in the notches of the locking plate, a follower on the cam, a rotatable Geneva wheel mounted in the rotative path of the follower and means connecting the Geneva wheel to the turret, the follower being operable to effect segmental rotation of the Geneva wheel and of the turret only when the locking bars are disengaged from the notches of the locking plate.

3. In the automatic turret lathe according to claim 1, wherein the second rotary camming connection includes a cam rotatably mounted on the support and a follower on the turret engageable with the cam, and wherein the turret drive means includes a spring means normally biasing the turret toward the fixed headstock stations, the cam being operable to retract the turret against the biasing action of the spring.

4. In the automatic turret lathe according to claim 1, wherein the first and second rotary camming mechanisms are interconnected by the gear train.

5. In the automatic turret lathe according to claim 1, wherein the clutch shifting device includes a trip dog arm pivoted to the turret support and a trip dog gear driven by the gear train and intermittently engageable with the trip dog arm to actuate the first camming mechanism for engaging the clutch.

References Cited

UNITED STATES PATENTS 2,628,414  2/1953  Montgomery _____ 29—43

FOREIGN PATENTS 691,919  5/1953  Great Britain.

RICHARD H. EANES, JR., *Primary Examiner.*